United States Patent [19]

Diemer et al.

[11] 4,413,496
[45] Nov. 8, 1983

[54] METHOD OF MAKING FLANGED TRACK TRACTOR ROLLER FOR OFF-HIGHWAY EQUIPMENT

[76] Inventors: Donald J. Diemer, 4355 Brendan La., North Olmsted, Ohio 44070; Ralph D. Delio, R.D. 1 Susan Trace, New Wilmington, Pa. 16142

[21] Appl. No.: 311,003

[22] Filed: Oct. 13, 1981

Related U.S. Application Data

[63] Continuation-in-part of Ser. No. 2,851, Jan. 12, 1979, Pat. No. 4,294,101.

[51] Int. Cl.³ .................. D21D 22/00; B21K 1/28
[52] U.S. Cl. .................................. 72/356; 72/358
[58] Field of Search .............. 72/356, 359, 354, 358, 72/360, 361, 420, 334, 377, 352

[56] References Cited

U.S. PATENT DOCUMENTS

| | | | |
|---|---|---|---|
| 585,821 | 7/1897 | Kent | 72/353 |
| 1,087,583 | 2/1914 | Hansen | 72/356 |
| 1,124,359 | 1/1915 | Taylor | 72/356 |
| 1,397,566 | 11/1921 | Walter | 72/353 |
| 1,785,495 | 12/1930 | Richard | 76/107 R |
| 2,105,289 | 1/1938 | Lobdell | 72/353 |
| 2,138,106 | 11/1938 | Klocke | 72/445 |
| 2,333,418 | 11/1943 | Fischer | 72/358 |
| 2,342,021 | 2/1944 | Swanson | 72/358 |
| 4,074,559 | 2/1978 | Beane | 72/354 |

*Primary Examiner*—Gene Crosby
*Attorney, Agent, or Firm*—Fay & Sharpe

[57] ABSTRACT

A method of forging track tractor rollers and other multi-flanged rollers, which comprises busting of a billet to a preformed coned end and placing a split ring around the coned end of the busted and preformed billet, and inserting the same in a stepped blocking die to form flanges by blocking against the split ring and the stepped die for one flange and between the top die on the other flange and removing the split ring and billet. When placed in a finishing die, the hollow of the roller is formed by a displacement method which forces the metal into the flanges against the split ring.

13 Claims, 12 Drawing Figures

METHOD OF MAKING FLANGED TRACK TRACTOR ROLLER FOR OFF-HIGHWAY EQUIPMENT

This application is a continuation-in-part of application Ser. No. 2,851, filed Jan. 12, 1979, now U.S. Pat. No. 4,294,101.

BACKGROUND OF THE INVENTION

The current method of manufacturing flanged track tractor rollers requires the welding together of two halves which are longitudinally split. Forgings are supplied in halves and the end of each half is machined to provide cavities for welding purposes. The halves are welded together to make one piece, then stress relieved at the welds and machine finished.

In connection with prior developments, forging of a double flanged roller is accomplished by busting and blocking in the conventional manner so that the larger flange is formed at the upper portion. The double flanged roller forging is then trimmed, pierced and moved to still another machine, known as a flanging press. The press includes two sliding side dies and a top die with a long protruding punch. The slide dies move horizontally to meet at the forging where the second flange is then formed. The top dies moves in a vertical direction, with the long punch also moving vertically but through the top portion, after the sliding dies are positioned, and continuing down to form the second flange. Because of the nature of this type of operation, flashing of the second flange results in misalignment of the split sliding dies. Misalignment, of course, gives uneven surfaces between the two flanges. Flashing and uneven surfaces create problems in the machining operation and, thus, slower machine time.

The known track tractor rollers are made in halves, i.e. either the single flange or the double flange is of a different diameter than the first flange, but there are at least two half track tractor rollers which must be welded together to form a full track tractor roller. The present invention, however, makes either half rollers or full rollers with either single or double flanges.

The prior art developments are taught in such patents as the following:

| U.S. Pat. No. | Patentee | Date |
| --- | --- | --- |
| 585,821 | H. P. Kent | July 6, 1897 |
| 1,397,566 | W. H. Walter | Nov. 22, 1921 |
| 2,105,289 | E. J. Lobdell, Jr. | Jan. 11, 1938 |

Kent U.S. Pat. No. 585,821 discloses a device for manufacturing a watch rim center wherein a split ring die F is positioned within a die block H to form a bead on the outer surface of the watch rim. The ring die F is employed in a similar manner as that discussed in the present invention, but the ring die in Kent does not include tongs nor would it be suitable for use in manufacturing a track tractor roller as described and claimed herein.

Walter U.S. Pat. No. 1,397,566 teaches sliding dies 3, which are moved into position relative to wheel 13 to form spaced annular flanges 14 on the outer surface thereof. Walter does not disclose split rings being connected together by means of tongs.

Lobdell U.S. Pat. No. 2,105,289 teaches a press wherein a confining ring 15, having a plurality of elements, is connected together by hinges 27. The confining ring of Lobdell is positioned within a press. However, the confining ring does not include tongs nor is it entirely positioned within the press.

SUMMARY OF THE INVENTION

In the method of the present invention, it is possible to make either one half of a track tractor roller or the full roller with two flanges or four flanges in a single forging operation in the manner hereinafter to be described. Forging is accomplished in a pierce by displacement method, which uses a technique employing split rings and tongs for fastening around a forging while in the blocking and finishing dies of the forging process.

Therefore, the present invention is directed to a method of forging flanged track tractor rollers which are especially suited for off-highway equipment, as well as for roller bearing shells, crane wheels and oil well drilling cones. The half or full track tractor roller may be produced by taking 4-5 inch, $\frac{1}{4}''$ round-cornered squares, initiating a busting operation to break off the scale on the heated metal and then forming a large flange. Split rings and tongs are then placed around the flange and onto the body of the forging. This forging and the split rings are inserted into a blocking die which has a step in the bottom die so there is an enlarged cavity in the die for a flange of the roller. Another flange is positioned between the split ring and the top die. A pierce by displacement technique is employed so that the metal is formed around the split rings for the flanges of the roller.

The handle for the split rings (a part of the tongs) projects through the pair of dies but doesn't touch. The forging and tongs are removed and placed into the finishing die to further complete the operation in a pierce by displacement forging for forming a half or full track tractor roller against the split rings. Then the forging and split rings are removed. When the split rings are removed from the forging, the forging is ready for the punching and trimming operation, being held in position between a nest and a stripper, so that a circular trim ring cuts the flange to its finished dimension and the punch makes the cavity in the track tractor roller. The forging is thus ready for its final machining operation.

The basic steps of the invention consist of taking a heated billet and busting it to knock off the scale, preforming the billet to a coned end around which a pair of split rings may be slipped on underneath the flange, together with a tong to handle the split rings. By insertion into a preforming die having a stepped cavity, the initial stages of a pierce by displacement technique is employed whereby the billet is formed against the step in the bottom die and against the split rings and the top to determine the outside contour for either the half or full track tractor roller.

The forging and the split rings are taken from the blocking die and placed into a finishing die so that the pierce by displacement techniques may be completed, and the metal in the forging is forced to conform with the split rings to form the flanges in the die. By this means a single flashing outwardly of one flange is formed which permits metal stress relief. The split rings and forging are then removed from the finishing die. The split rings are now off the die, and the forging is placed into a punch and is held in position by a stripper for the trimming operation. The outside trim ring cuts off the track tractor roller flange flashing, and the punch is directed down the center of the roller so that it punches through a cavity which has been formed by the pierce by displacement blocking and finishing operation, and thus the cylindrical form of the track tractor roller is completed.

The invention then is directed to a new and improved forging technique which uses a pierce by displacement method so that a half or full track tractor roller may be formed in a forging press, the novel steps of which consist of containing the forge in a pair of split rings that are held together by means of tongs. A track tractor roller is formed in a vertical position, i.e. along the axis of the roller, and against the sides of the split rings to form circumferential flanges, and at the same time in several operations. A blocking and finishing operation forms a cavity in the roller, forcing the metal into the flanges so that the split rings and tongs may be removed from the forging, after which piercing and trimming take place.

Further, the invention provides for simplification of the track tractor roller forming steps. A single-double flanged roller and a double-double flanged roller may be produced in a single set of forging operations, eliminating the requirement of welding separate parts together.

The invention provides a new and improved technique for the manufacture of a half track tractor roller in a single forging step by the employment of split rings and tongs which form circumferential flanges while at the same time the pierce by displacement method forms a cavity within the roller.

Further embodiments of the invention are used to produce cluster gear blanks, bicycle hubs, roller bearing shells, crane wheels and oil drilling cones.

DESCRIPTION OF THE PREFERRED EMBODIMENT

The method heretofore known of manufacturing single and double flanged track tractor rollers requires welding together of two halves which are longitudinally split. Forgings are supplied in halves, and the ends of each half are machined to provide cavities for welding, and then the two halves are welded together to make one. The piece is then stress relieved, welded and machine finished.

In the present invention, however, it is possible to produce single and double flanged rollers (normally two halves in one piece) by means of the use of split rings and pierce by displacement on a mechanical forging press. The size of such rollers vary from 20–140 pounds per half. In other words, the parts may be from 40–280 pounds and are made on a mechanical press having a capacity which ranges from 2,500 to 8,000–10,000 tons.

Figure 1:
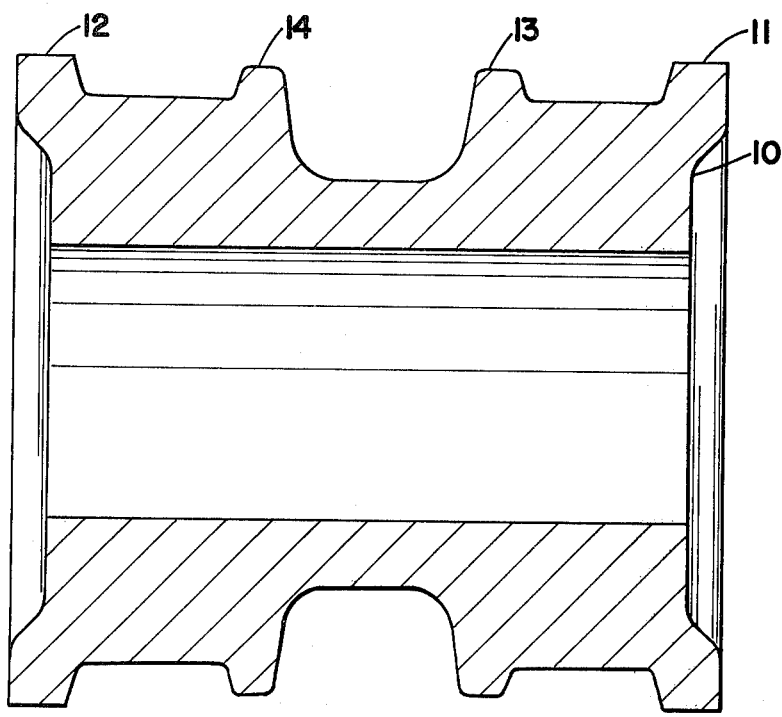
FIG. 1 is an axial cross section of the finished double flanged track tractor roller.
Figure 2:
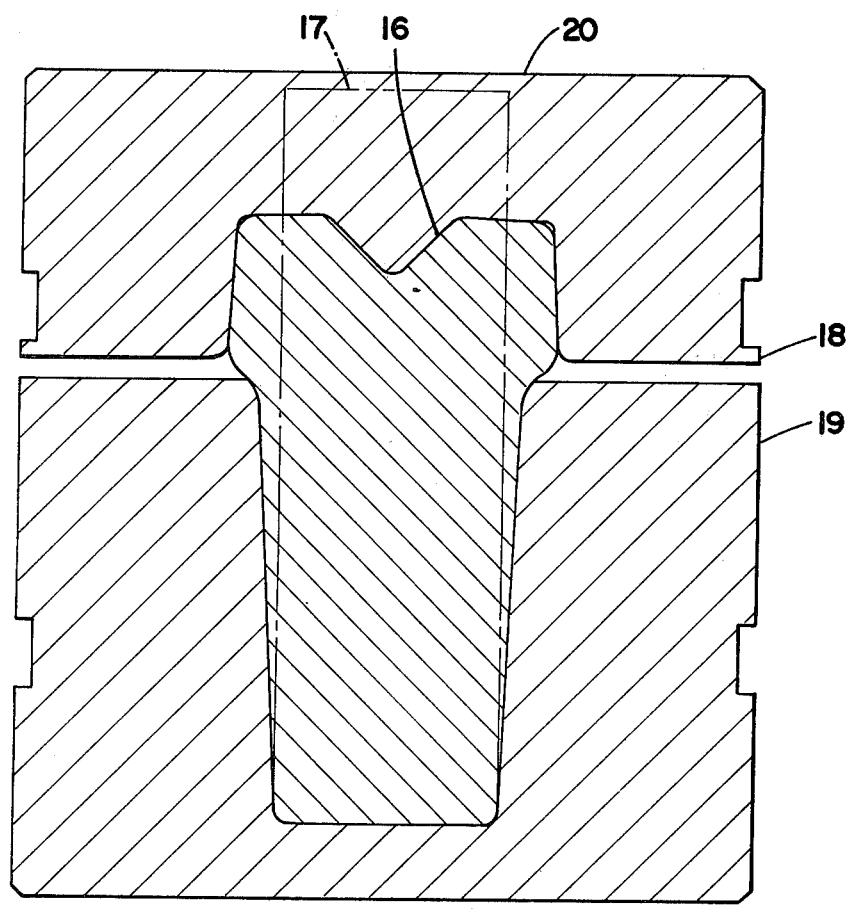
FIG. 2 is a cross section through the first operation of preforming the raw round material.
Figure 3:
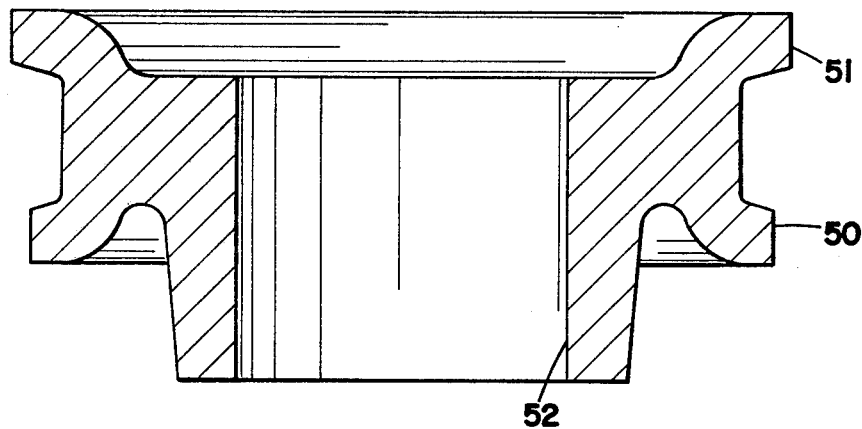
FIG. 3 is a cross section of a half track tractor roller.

The invention takes into consideration the following steps:

From a round or round-cornered square billet of a size 4–5¾ inches, raw hot material is squeezed between open dies to break off scale and is then formed with a coned end and an enlarged head, which may be seen in connection with FIG. 2. FIG. 1 generally shows a double flanged track tractor roller at 10 with an outside flange on one side at 11 and on the other side at 12. Inside flanges are noted at 13 and 14. Prior to the present invention, rollers were typically made in two pieces, such as shown generally at 15. In FIG. 2, which is actually the busting operation, a round billet 17 is busted, i.e. the scale is broken off the billet, and it is formed with a head or large section which is shown generally at 18 and then formed in the cavity of the bottom die 19. The upper die is noted at 20. The head section or flange 18 permits enclosing of the billet with a split ring. A locator 16 is formed in the billet.

The half roller has two flanges 50 and 51 and a central cavity 52. Two of these are welded together to form a full roller.

Figure 5:
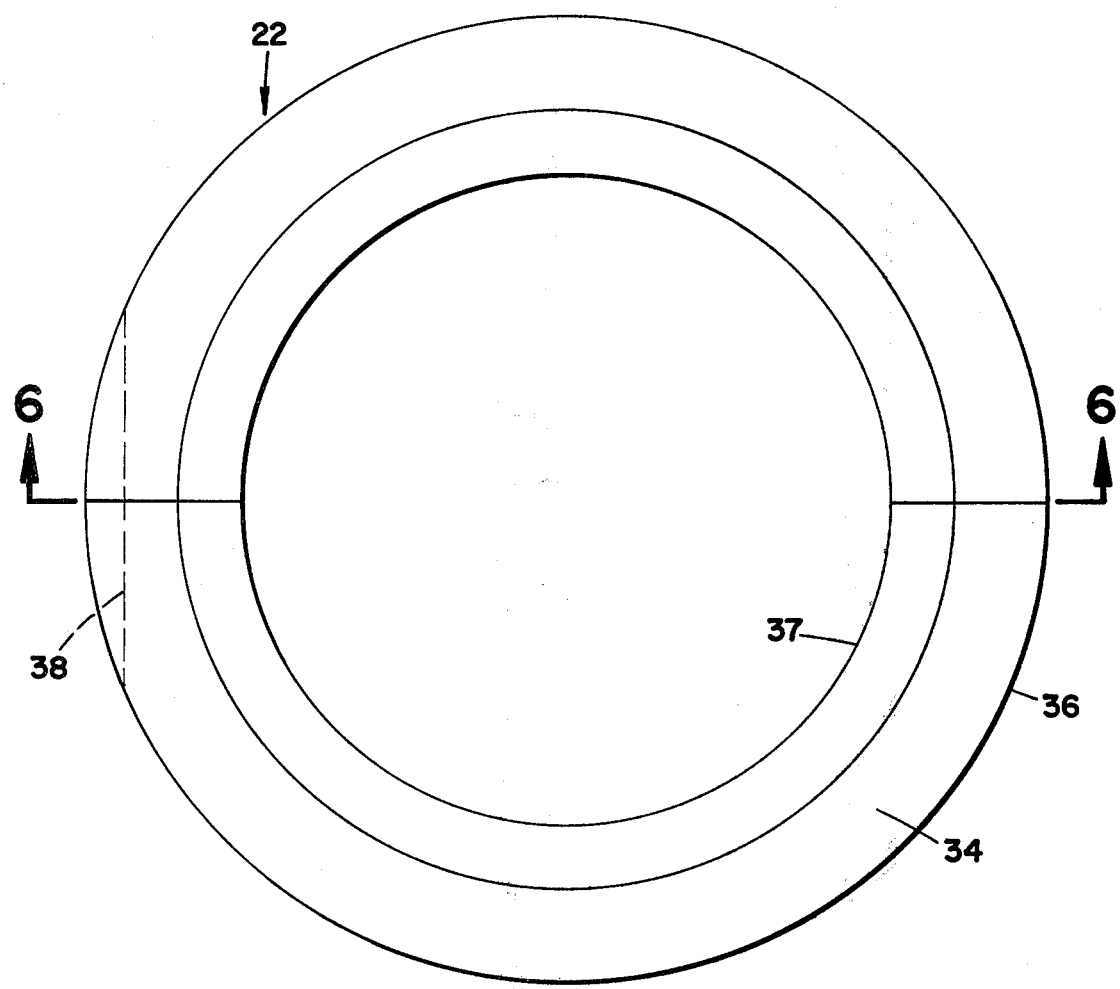
FIG. 5 is a top plan view of the split ring used to form the roller of FIGS. 3 and 4.
Figure 6:
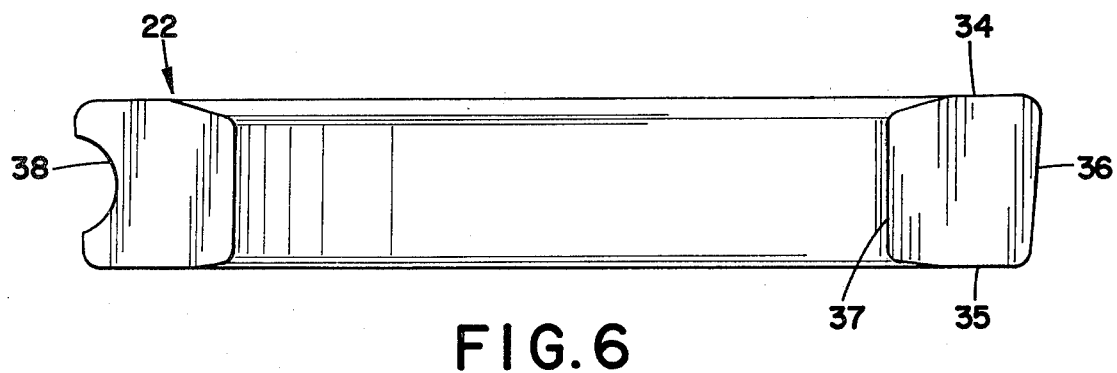
FIG. 6 is a side view of a split ring along the line 6—6 of FIG. 5.

The busted billet is enclosed with a split ring 22 as shown in FIGS. 5 and 6, which is designed to mate with a cavity 23 in the bottom die 27 where there are retaining means in the form of a rolling key 24 which is formed with a circular section cut along a chord as at 25. The rolling key rotates to retain the ring 22 in position when plunger 26 stresses the metal on withdrawal. Certain forming operations do not require the rolling key or its equivalent.

In the lower reaches of the bottom die 27 is step cavity 28 which permits formation of a flange. Extensions deep in the bottom die as at 29 provide for the axial portion of the half roller. A second flange is formed between the split ring 22 and the top die 30 which includes a top die cavity 31. Note the die cavities 31 and 28 which form flanges 51 and 50, respectively.

Figure 4:
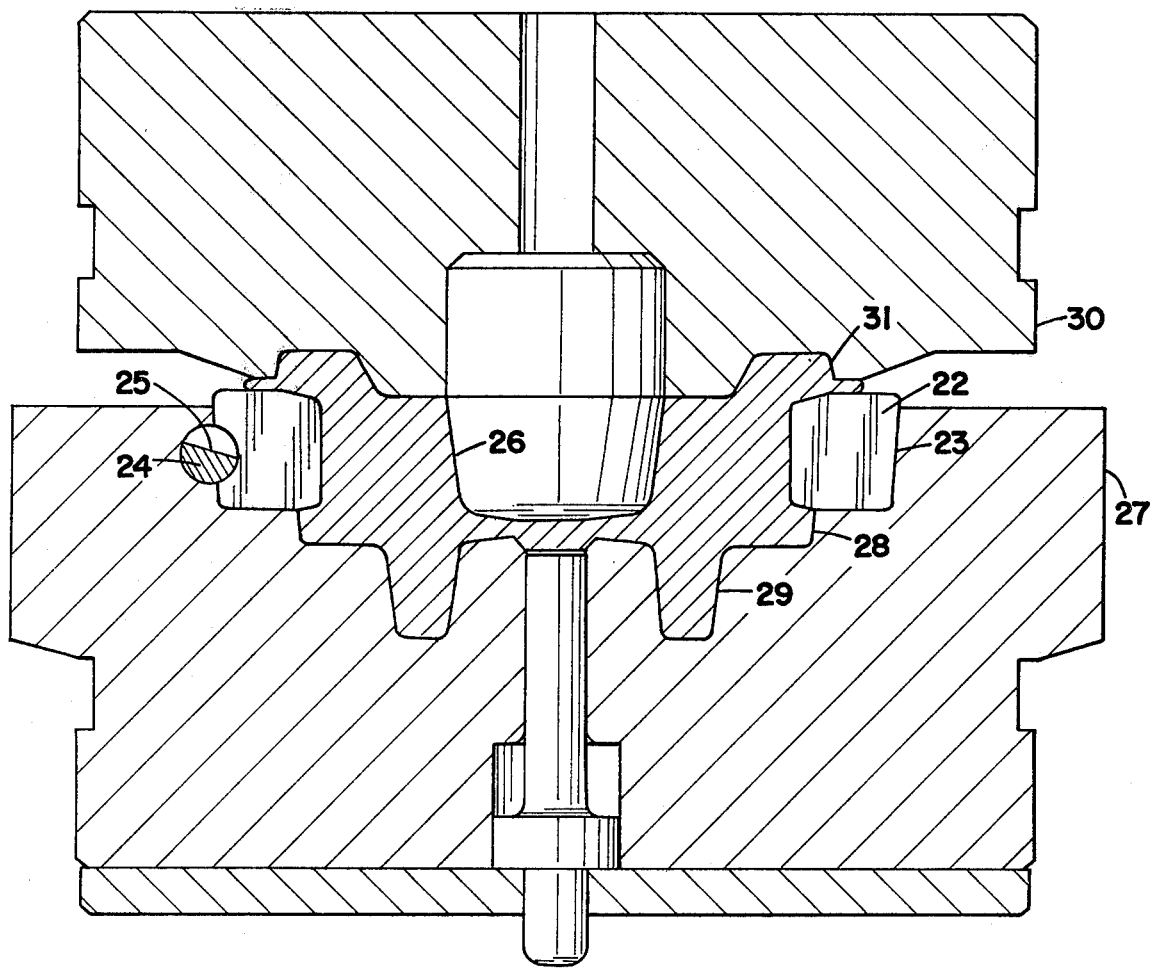
FIG. 4 is a cross section of the forging operation showing the roller of FIG. 3 in a pierce by displacement operation.

FIGS. 5 and 6 show the split ring of FIG. 4. Tongs, which are not shown, are used to handle the rings and forging to move the forging into and out of the bottom die. The tongs are illustrated in FIG. 14 of U.S. Pat. No. 4,294,101, the parent case.

Each split ring has a top surface 34 and a bottom surface 35 as well as an exterior surface 36 and an interior surface 37. Inside is a groove 38 for the rolling key 24 (FIG. 4).

Figure 7:
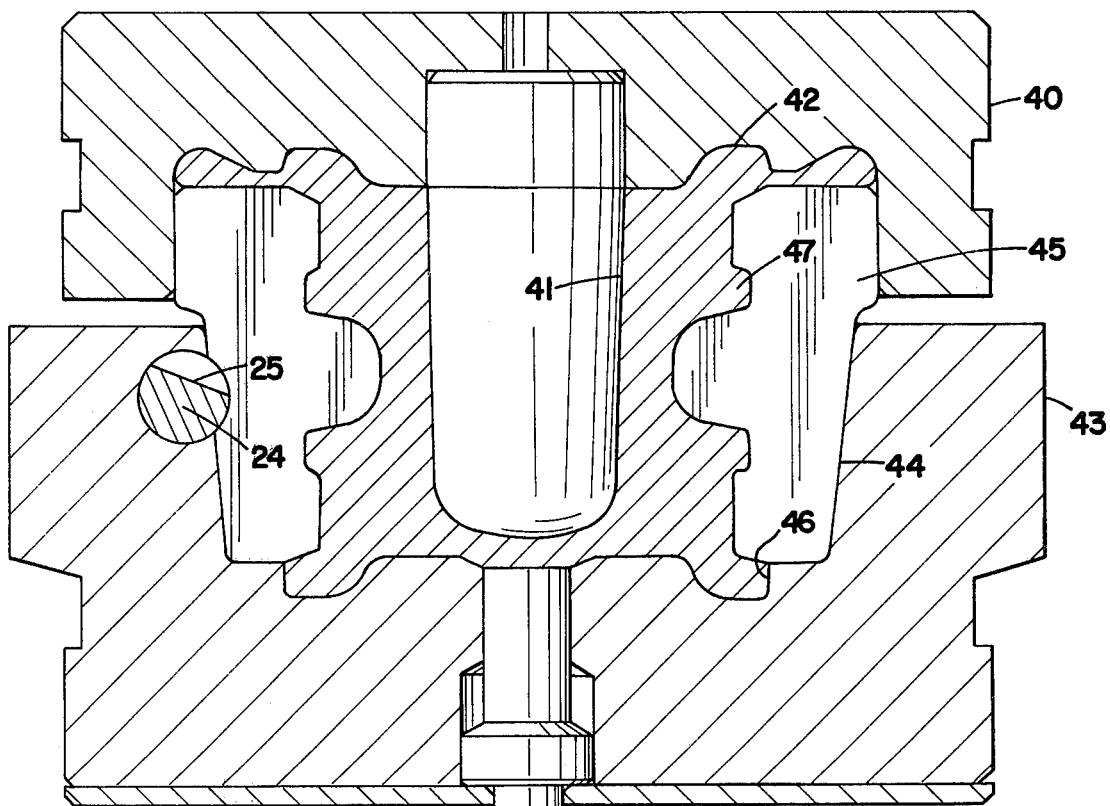
FIG. 7 is a cross-sectional view of the top and bottom dies and the split rings used to form the roller of FIG. 1 with its four flanges.
Figure 8:
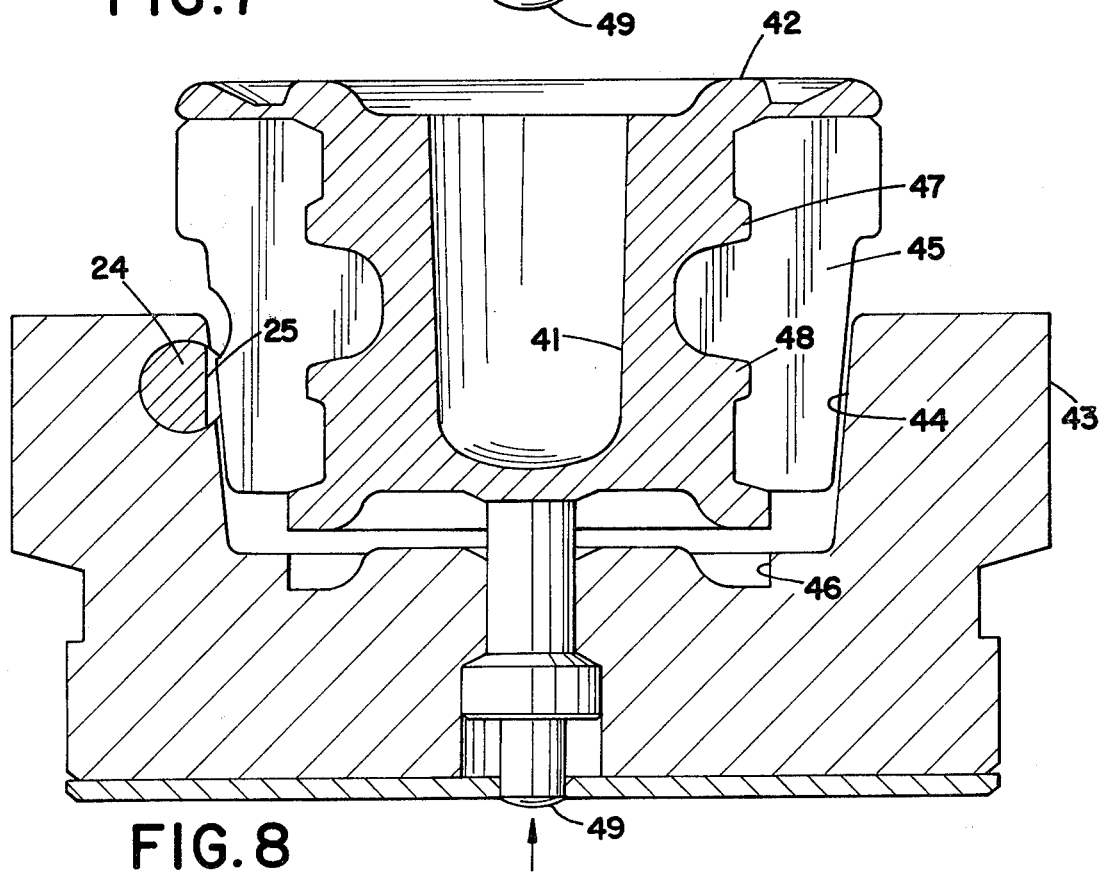
FIG. 8 is a cross-sectional view of FIG. 7 showing the ejector forcing the forging and split rings out of the bottom die and the rolling key in a different position.

FIGS. 7 and 8 show the forging for a four-flanged roller. In these views, the metal is forged with a top die 40 which has a center plunger 41 and a circumferential groove 42. Bottom die 43 has a central cavity 44 and split ring 45 which rest on step 46 in cavity 44. The stepped cavity forms a second flange which is equivalent to flange 11 of FIG. 1. Flange 12 is formed by the cavity 42 in the top die, and flanges 13 and 14 are formed by grooves 47 and 48 in split ring 45. A two-flanged full roller would not have these grooves. Rolling key 24 locks the rings in position to allow withdrawal of plunger 41. After forging is completed and the press stroke is over the top die, its plunger 41 is withdrawn, and rolling key 24 rotates as seen in FIG. 8. Air ejector 49 ejects the forging and its split ring 45 as will be seen in FIG. 8. The tongs of the split ring are opened, and the roller is trimmed and punched as seen in FIG. 5 of U.S. Pat. No. 4,294,101.

Figure 9:
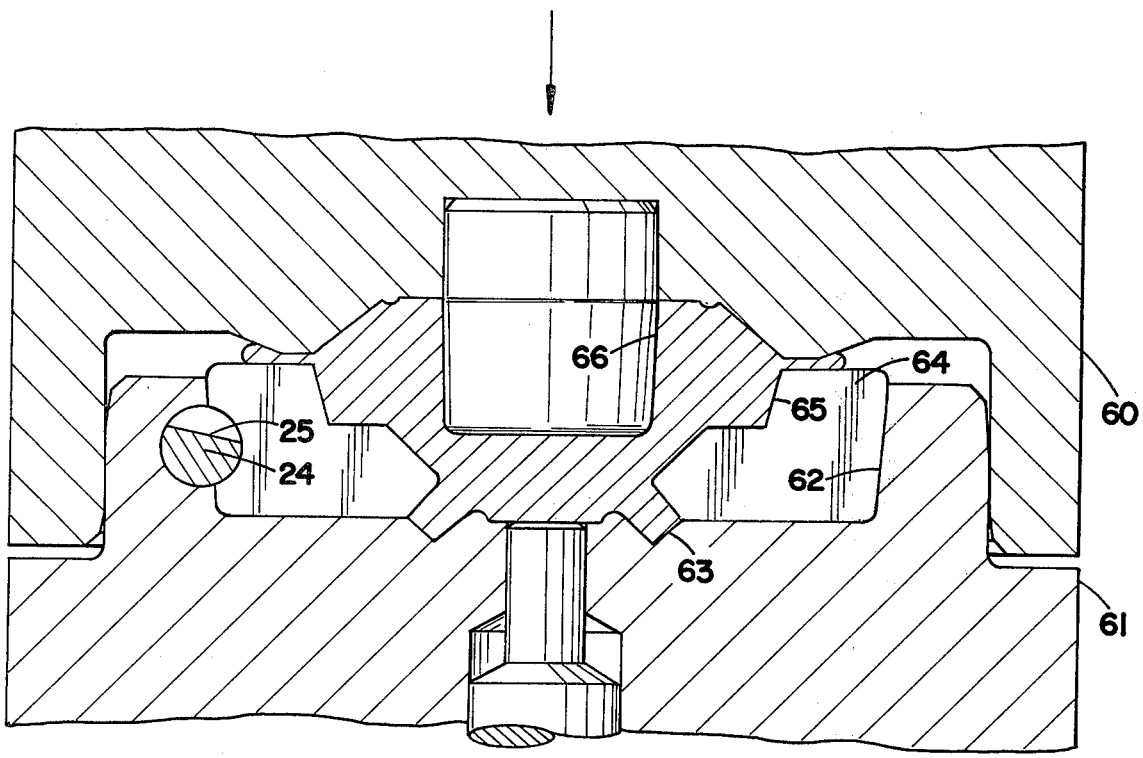
FIG. 9 is a cross-sectional view of a forged drilling bit cone.

FIG. 9 illustrates how the drilling bit cone ring may be forged in a similar manner. In that view top die 60 closes on bottom die 61. The bottom die includes cavity 62 which has step 63 of lesser diameter. Rolling key 24 retains the ring 64 in position to form the cone, which may have an interior configuration 66 for reducing machining of the cone where bearings are located. Step 63 forms the rock bit portion of the drill bit, and the groove 65 forms a ring from which the intermeshing teeth are formed.

Figure 10:
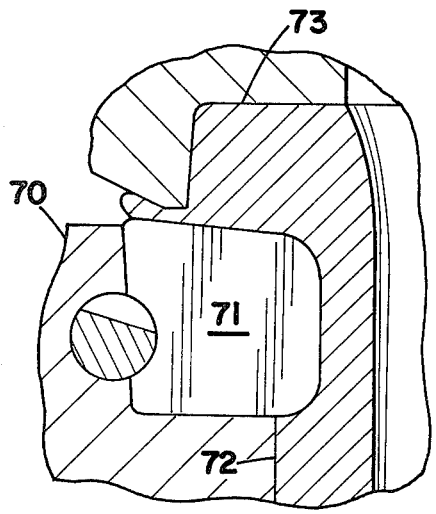
FIG. 10 is a cross-sectional view of a forging showing the split ring and stepped cavity of a variant form.
Figure 11:
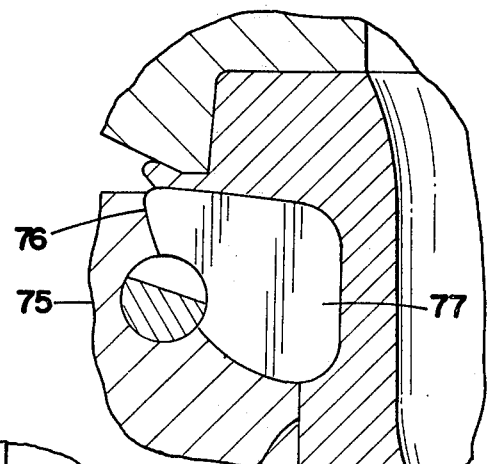
FIG. 11 is a cross-sectional view of a split ring and stepped cavity of still another form.
Figure 12:
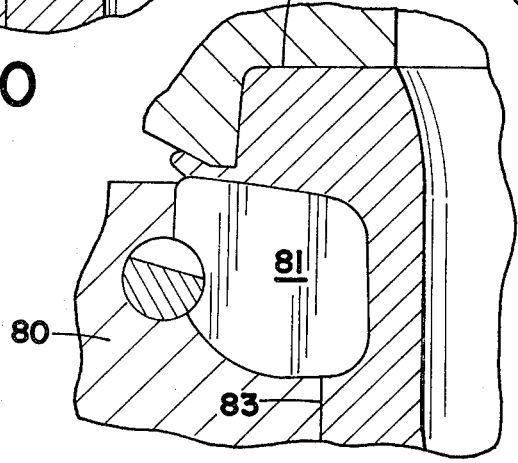
FIG. 12 is a further cross-sectional view of another split ring and stepped cavity.

FIGS. 10-12 illustrate portions of the bottom die showing various forms of the split ring. Depending upon the forces and the plunger, a rolling key may or may not be required. FIG. 10 shows bottom die 70 and its split ring 71 with step 72. Note large flange 73 which is formed by the cavity in the top die. FIG. 11 illustrates bottom die 75 with its concave surface 76 for ring 77. Step 78 is shown below the ring to form another flange. FIG. 12 shows still another form and includes bottom die 80, ring 81 and forming flanges 82 and 83. In all instances, the rolling key is illustrated.

The techniques employed by the means of this invention result in rollers, cluster gears, sun gears, cone rings, roller bearing shells, bicycle hubs and crane wheels, each having at least two flanges from which the parts are machined. The split rings of the instant invention form flanges for two or more flanged rollers resulting in greatly simplified machining of the final product. In almost all cases, a part is formed with one flange being formed in the stepped portion of the bottom die and a second flange being formed in a cavity in the top die with each of the flanges being of comparable diameter in size. Between the flanges grooves may be in the split rings so that additional flanges of comparable diameter size are formed as desired.

Although the invention has been shown and described with respect to preferred and alternative embodiments, modifications and alterations will occur to others upon a reading and understanding of this specification. The present invention includes all such modifications and alterations insofar as they come within the scope of the appended claims or the equivalents thereof.

What is claimed is:

1. A closed die forging apparatus to produce a forged roller or its equivalent, comprising:
   A. a bottom die cavity consisting of a generally circular first cavity;
   B. a step in said cavity for a smaller diameter cavity immediately below said first cavity;
   C. a split ring in said first cavity projecting inwardly and forming a cavity of lesser diameter than said step cavity;
   D. a top die cavity consisting of a generally circular second cavity of a diameter approximating that of said step cavity but of lesser diameter than said first cavity; and
   E. said top die cavity having a plunger which extends into said bottom die cavity and forms a central cavity and said bottom die having a portion centrally thereof which projects near the plunger, whereby the closing of said top and bottom die cavities produces a roller or its equivalent and includes at least two flanges, one of which is formed by the step cavity and the other of which is formed by the top die closing of said bottom die near said split rings.

2. The apparatus of claim 1 wherein the split ring has one or more grooves and forms flanges in said forged flanged roller.

3. The apparatus of claim 1 wherein the roller has a reduced center portion and the split ring has a greater radial thickness midway in the split ring.

4. The apparatus of claim 1 wherein the bottom die has a rolling key which is connected to the split ring and secures the split ring against uplift as the plunger is pulled out of the bottom die.

5. The apparatus of claim 1 wherein the split ring extends into the top die and the top die provides outward support in its closed position.

6. The apparatus of claim 1 wherein the roller is a four-flanged roller.

7. The apparatus of claim 1 wherein the roller is a two-flanged roller.

8. The apparatus of claim 1 wherein the portion centrally of the bottom die and the plunger of the top die are axially close in closed die forging position, whereby the central cavity forms a major part of the central bore of the roller.

9. The apparatus of claim 1 wherein the roller has at least one flange projecting radially outwardly and formed by the step cavity, and a second flange formed in the top die cavity with the split ring.

10. A method of closed die forging to form a flanged cylindrical metal part having at least two exterior cylindrical flanges and a cylindrical cavity, which comprises the steps of:
    A. inserting a prepared billet and a split ring outwardly thereof into a set of dies;
    B. mating and supporting said ring within a cavity of the first one of said dies with a step in the die away from the other die, said step being of lesser diameter than said cavity of said first die, said step allowing for one flange of said flanged cylindrical metal part;
    C. closing the other end of said ring with the other die wherein there is a center plunger to form a central cylindrical cavity and a cavity of a diametral size approaching that of the step cavity, thus forming a second flange in the flanged cylindrical metal part with one on either side of the split ring and the central cylindrical cavity; and
    D. removing the split ring and flanged cylindrical metal part from the first dies and finish forming and trimming the part.

11. The method of claim 10 wherein the cylindrical metal part is a tractor track roller.

12. The method of claim 10 wherein the part is trimmed to remove flashing around one of the flanges and punched axially all in a single operation to form the cavity into a cylindrical thru hole.

13. The method of claim 10 wherein the split ring has a radial operative opening outwardly into the bottom finishing die adapted for a rolling key to prevent uplift of the ring in forging.

* * * * *